United States Patent
Moon

(10) Patent No.: US 12,039,190 B2
(45) Date of Patent: Jul. 16, 2024

(54) MEMORY SYSTEM AND OPERATING METHOD OF THE MEMORY SYSTEM FOR CALIBRATING A HISTORY READ BIAS BASED ON A NUMBER OF ERROR BITS GENERATED IN A READ OPERATION

(71) Applicant: SK hynix Inc., Icheon-si (KR)

(72) Inventor: Min Hwan Moon, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 167 days.

(21) Appl. No.: 17/171,876

(22) Filed: Feb. 9, 2021

(65) Prior Publication Data

US 2022/0083255 A1 Mar. 17, 2022

(30) Foreign Application Priority Data

Sep. 14, 2020 (KR) .................. 10-2020-0117490

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ............................ G06F 3/0655; G06F 3/0604
See application file for complete search history.

(56) References Cited

U.S. PATENT DOCUMENTS

| | | | | |
|---|---|---|---|---|
| 2009/0310408 A1* | 12/2009 | Lee | ..................... | G11C 16/0483 365/185.09 |
| 2012/0008414 A1* | 1/2012 | Katz | ..................... | G11C 16/26 365/185.24 |
| 2019/0108091 A1* | 4/2019 | Chen | ................... | G06F 11/1471 |
| 2020/0409597 A1* | 12/2020 | Ganesh | ................ | G06F 3/0659 |

FOREIGN PATENT DOCUMENTS

| | | |
|---|---|---|
| KR | 10-2016-0000055 A | 1/2016 |
| KR | 10-2016-0055309 A | 5/2016 |

* cited by examiner

*Primary Examiner* — David Yi
*Assistant Examiner* — Nicholas A. Paperno
(74) *Attorney, Agent, or Firm* — Weaver Austin Villeneuve & Sampson LLP

(57) ABSTRACT

Embodiments of the present disclosure relate to a memory system and an operating method thereof. According to exemplary embodiments of the present disclosure, the memory system may calibrate a history read bias until a termination condition is satisfied based on a number of error bits generated in a first read operation. The memory system may reduce the overhead incurred in handling errors that occur during a read operation by reducing the number of error bits that can occur during read operation due to non-optimization of the history read bias value.

20 Claims, 16 Drawing Sheets

MEMORY SYSTEM AND OPERATING METHOD OF THE MEMORY SYSTEM FOR CALIBRATING A HISTORY READ BIAS BASED ON A NUMBER OF ERROR BITS GENERATED IN A READ OPERATION

CROSS-REFERENCE TO RELATED APPLICATION

The present application claims priority under 35 U.S.C. 119(a) to Korean patent application number 10-2020-0117490 filed on Sep. 14, 2020, which is incorporated herein by reference in its entirety.

BACKGROUND

1. Technical Field

The embodiments relate to a memory system and an operating method thereof.

2. Related Art

A memory system, e.g., a storage device, stores data on the basis of a request from a host, such as a computer, a mobile terminal (for example, a smartphone or a tablet), or any of various other electronic devices. The memory system may be a type of device that stores data in a magnetic disk such as a hard disk drive (HDD), or a type of device that stores data in a nonvolatile memory such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute or control operations for reading, writing, or erasing data in a volatile memory or a nonvolatile memory included in the memory system. The memory controller may drive firmware for performing a logical operation for controlling such operations.

The memory system, when reading data stored in a specific memory block of a memory device, may use the corresponding history read bias value if there is a history read bias value corresponding to the specific memory block in the history read bias table. In this case, if the history read bias value corresponding to the specific memory block is not optimized, there may be a problem in that the number of error bits generated when reading data stored in the corresponding memory block increases.

SUMMARY

Embodiments of the disclosure may provide a memory system and an operating method thereof capable of reducing the overhead incurred in handling errors that occur during a read operation by reducing the number of error bits that can occur during read operation due to non-optimization of the history read bias value.

In addition, embodiments of the present disclosure may provide a memory system and an operating method thereof capable of omitting a separate operation performed to calibrate the history read bias value before and after the read operation by calibrating the history read bias value during the read operation.

In one aspect, embodiments of the disclosure may provide a memory system comprising a memory device including a plurality of memory blocks, and a memory controller for communicating with the memory device and controlling the memory device.

The memory controller may store information on a number of error bits generated in a first read operation in an error bit history set when the number of error bits generated in the first read operation for a first memory block among the plurality of memory blocks is greater than or equal to a first threshold and less than a second threshold.

In addition, the memory controller may repeat, during a read operation performed after the first read operation for the first memory block, an operation of calibrating a history read bias corresponding to the first memory block until a set termination condition is satisfied.

In this case, the error bit history set may store the number of error bits generated during a read operation for a target memory block, which is a memory block for which the history read bias is calibrated among the plurality of memory blocks.

In another aspect, embodiments of the disclosure may provide an operating method of a memory system including a memory device including a plurality of memory blocks.

The operating method of the memory system may comprise determining a number of error bits generated in a first read operation for a first memory block among the plurality of memory blocks.

In addition, the operating method of the memory system may comprise storing information on the number of error bits generated in the first read operation in an error bit history set when the number of error bits generated in the first read operation is greater than or equal to a first threshold and less than a second threshold.

In addition, the operating method of the memory system may comprise repeating, during a read operation performed after the first read operation for the first memory block, an operation of calibrating a history read bias corresponding to the first memory block until a set termination condition is satisfied.

In this case, the error bit history set may store the number of error bits generated during a read operation for a target memory block, which is a memory block for which the history read bias is calibrated among the plurality of memory blocks.

According to the embodiments of the disclosure, it is possible to reduce the overhead incurred in handling errors that occur during the read operation by reducing the number of the error bits that can occur during read operation due to non-optimization of the history read bias value.

In addition, according to the embodiments of the disclosure, it is possible to omit a separate operation performed to calibrate the history read bias value before and after the read operation by calibrating the history read bias value during the read operation.

DETAILED DESCRIPTION

Hereinafter, exemplary embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
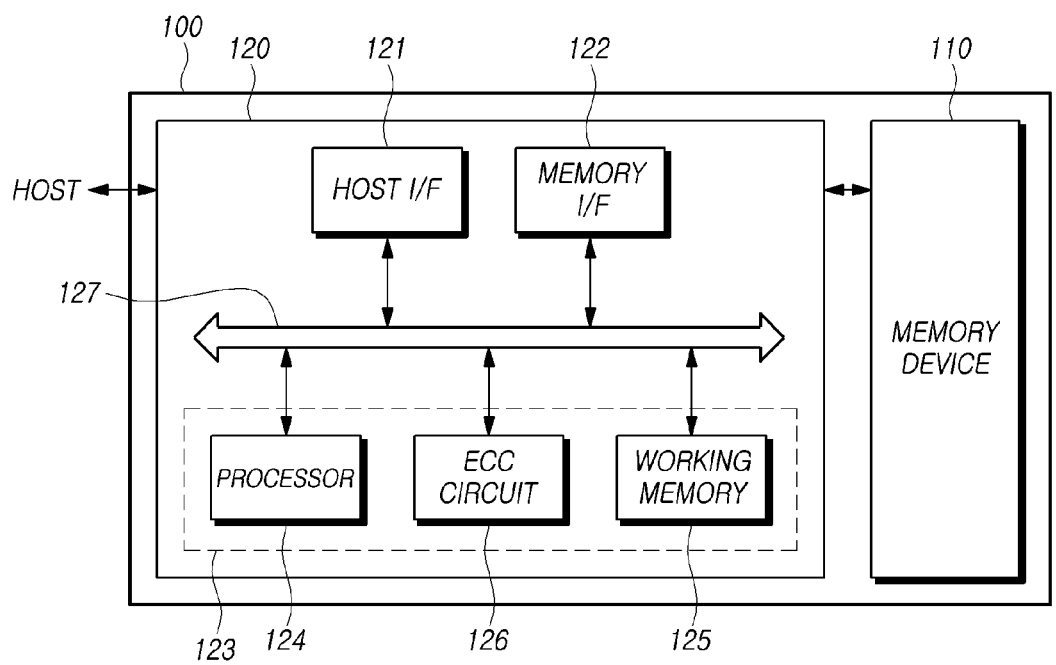
FIG. 1 is a schematic diagram illustrating a configuration of a memory system according to an exemplary embodiment of the present disclosure.

FIG. 1 is a diagram illustrating the schematic configuration of a memory system 100 based on an exemplary embodiment of the disclosed technology.

In some implementations, the memory system 100 may include a memory device 110 configured to store data, and a memory controller 120 configured to control the memory device 110.

The memory device 110 may include multiple memory blocks each including a predetermined number of memory cells for storing data. The memory device 110 may be configured to operate in response to control signals received from the memory controller 120. Operations of the memory device 110 may include, for example, a read operation, a program operation (also referred to as a "write operation"), and an erase operation.

The memory cells in the memory device 110 are used to store data and may be arranged in a memory cell array. In some implementations where the memory device 110 is a flash memory device, the memory cell array may be divided into memory blocks of memory cells and each block includes different pages of memory cells. In some implementations of NAND flash memory devices, a page of cells is the smallest memory unit that can be programmed (or written) and read, and the data stored in memory cells can be erased at the block level.

In some implementations, the memory device 110 may be implemented as various types, such as a double data rate synchronous dynamic random access memory (DDR SDRAM), a low power double data rate fourth generation (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementations, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area in the memory device having a physical address corresponding to the received address from the controller.

In some implementations, the memory device 110 may perform, among others, a program operation, a read operation, and an erase operation. During the program operation, the memory device 110 may write ("program") data to the area selected by the address. During the read operation, the memory device 110 may read data from a memory area selected by the address. During the erase operation, the memory device 110 may erase data stored in a memory area selected by the address.

The memory controller 120 may control write (program), read, erase, and background operations to be performed on the memory device 110. The background operation may include operations that are implemented to optimize the overall performance of the memory device 110, such as a garbage collection operation (GC), a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such a background operation of the memory device.

The memory controller 120 and the host may be separate devices. In some implementations, the memory controller 120 and the host may be integrated in a single device. In the following description, as an example, the memory controller 120 and the host are separate devices.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly coupled to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to run a flash translation layer (FTL) to effectively manage the memory operations on the memory system 100. For example, the processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) or any other type of suitable volatile memory.

The error detection/correction circuit (ECC) 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. As used herein, a "sector" may refer to a data unit that is smaller than the smallest unit for read operations (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability on a sector by sector basis. For example, if the BER is higher than a reference value, the error detection/correction circuit 126 may determine that the erroneous bits in the corresponding sector are uncorrectable and the corresponding sector is marked "fail." If the BER is lower than the reference value, the error detection/correction circuit 126 may determine that the corresponding sector is correctable and the corresponding sector can be marked "pass."

The error detection/correction circuit 126 may perform error detection and correction operations successively on all read data. When a sector included in the read data is correctable, the error detection/correction circuit 126 may go on to the next sector to check as to whether an error correction operation is needed on the next sector. Upon completion of the error detection and correction operations on all the read data in this manner, the error detection/correction circuit 126 may identify which sector is deemed uncorrectable in the read data. The error detection/correction circuit 126 may provide information (e.g., address of uncorrectable sector) regarding the sectors deemed uncorrectable to the processor 124.

The memory system 100 may also include a bus 127 to provide a channel between the constituent elements 121, 122, 124, 125, and 126 of the memory controller 120. The bus 127 may include, for example, a portion that forms a control bus for delivering various types of control signals and commands, and a portion that forms a data bus for delivering various types of data.

The above-mentioned constituent elements 121, 122, 124, 125, and 126 of the memory controller 120 are illustrated in FIG. 1 by way of example. It is noted that some of the above-mentioned constituent elements 121, 122, 124, 125, and 126 of the memory controller 120 may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Hereinafter, the memory device 110 will be described in more detail with reference to FIG. 2.

Figure 2:
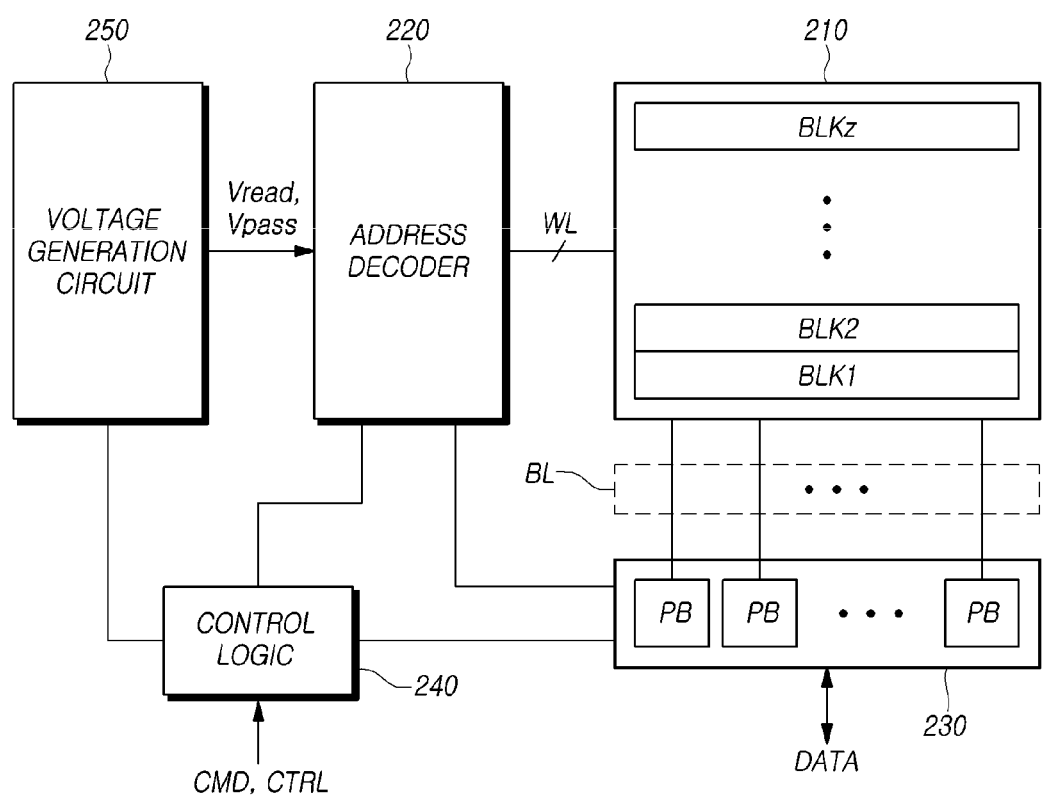
FIG. 2 is a block diagram schematically illustrating a memory device according to an exemplary embodiment of the present disclosure.

FIG. 2 is a block diagram schematically illustrating a memory device 110 based on an exemplary embodiment of the disclosed technology.

In some implementations, the memory device 110 may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be arranged in rows and columns, and multiple memory cells MC may be arranged.

The multiple memory blocks BLK1-BLKz may be coupled to the address decoder 220 through the multiple word lines WL. The multiple memory blocks BLK1-BLKz may be coupled to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure and, in some implementations, may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data per memory cell. As another example, each of the multiple memory cells included in the memory cell array 210 may be a multi-level cell (MLC) configured to store two bits of data per memory cell. As another example, each of the multiple memory cells included in the memory cell array 210 may be a multi-level cell such as a triple-level cell (TLC) configured to store three bits of data per memory cell. As another example, each of the multiple memory cells included in the memory cell array 210 may be a quad-level cell (QLC) configured to store four bits of data. As another example, the memory cell array 210 may include multiple memory cells that are configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be coupled to the memory cell array 210 through the multiple word lines WL.

The address decoder 220 may be configured to operate in response to commands and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 250 may apply the read voltage Vread to a selected word line WL inside a selected memory block, when applying the read voltage during a read operation, and may apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation on a page by page basis. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that can hold data for data processing and, in some implementations, may further include a cache buffer for data caching.

The multiple page buffers PB may be coupled to the memory cell array 210 through the multiple bit lines BL. In order to detect or sense the threshold voltage Vth of the memory cells during a read operation and a program verification operation, the multiple page buffers PB may continuously supply a sensing current to the bit lines BL coupled to the memory cells to detect, at a sensing node, a change in the amount of current that flows based on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be coupled to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level at sensing nodes of multiple page buffers PB.

The control logic 240 may control the read/write circuit 230 to perform a read operation on the memory cells in the memory cell array 210. The voltage generation circuit 250 may generate a read voltage Vread and a pass voltage Vpass, which are used during the read operation, in response to a voltage generation circuit control signal provided by the control logic 240.

A memory block BLK included in the memory device 110 may consist of multiple pages PG, each of which includes a plurality of memory cells. In some implementations, the plurality of memory cells can be arranged in multiple strings. The multiple pages PG can be mapped to multiple word lines WL, and the multiple strings STR can be mapped to multiple bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The multiple word lines WL and the multiple bit lines BL may intersect with each other when viewed from above, thereby defining a memory array including multiple memory cells MC. Each memory cell MC may have a transistor TR arranged therein.

For example, the transistor TR arranged in each memory cell MC may include a drain, a source, and a gate. The drain (or source) of the transistor TR may be coupled to the corresponding bit line BL directly or via another transistor TR. The source (or drain) of the transistor TR may be coupled to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed on a page by page basis, and an erase operation may be performed on a memory block by memory block basis.

Figure 3:
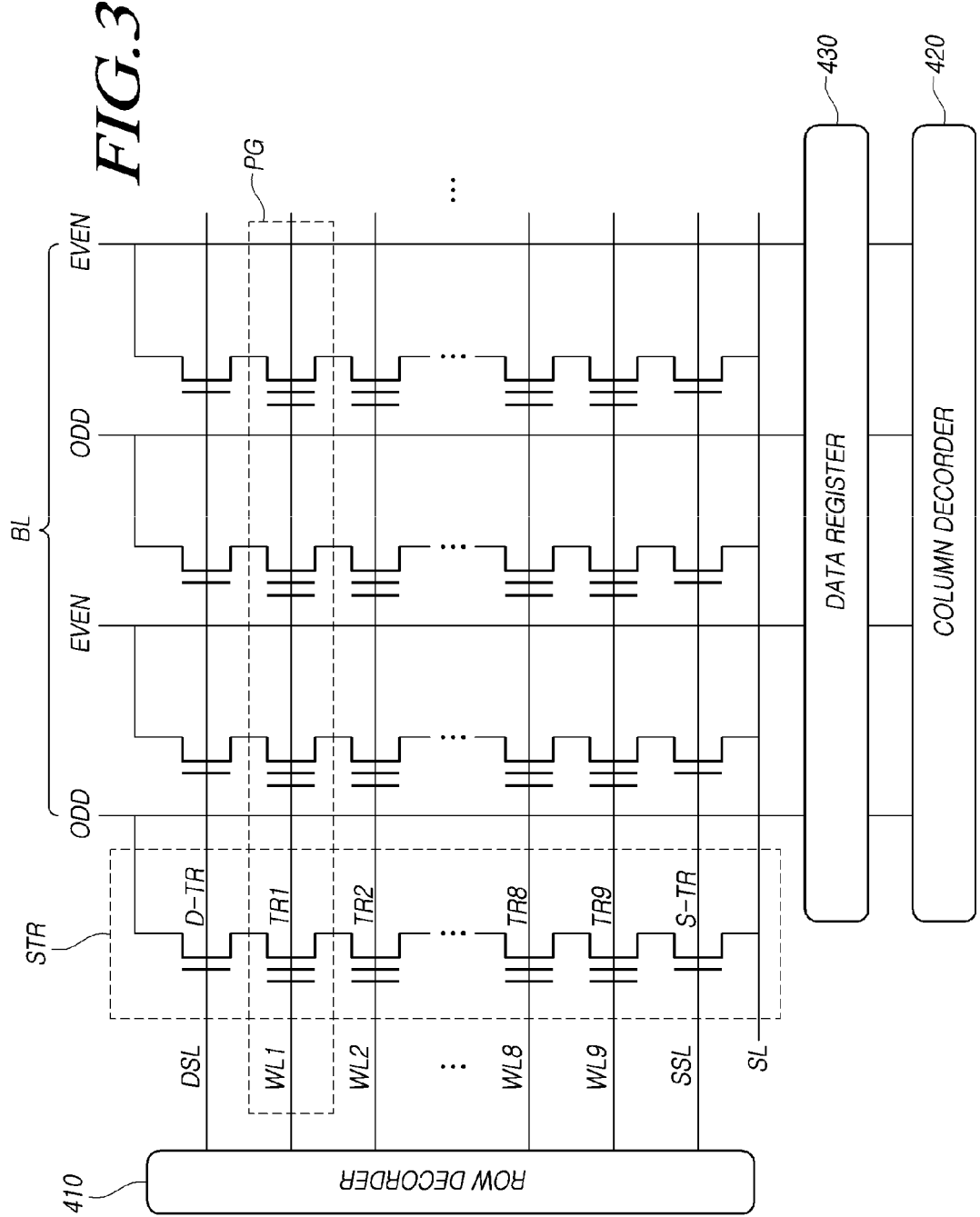
FIG. 3 is a diagram illustrating a structure of word lines and bit lines of a memory device according to an exemplary embodiment of the present disclosure.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are concentrated, and an auxiliary area which corresponds to the remaining area other than the core area. The auxiliary area includes circuitry for supporting the operations of the memory cell array 210.

The core area may include pages PG and strings STR. In some implementations, multiple word lines WL1-WL9 and multiple bit lines BL are arranged to intersect when viewed from above.

The word lines WL1-WL9 may be coupled to a row decoder 310. The bit lines BL may be coupled to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in connection with conducting a program operation and a read operation, and all memory cells MC within the same page PG may perform simultaneous operations when conducting a program operation and a read operation.

The multiple bit lines BL may be coupled to the column decoder 320. In some implementations, the multiple bit lines BL may be divided into odd-numbered bit lines BL and even-numbered bit lines BL such that a pair of odd-numbered bit line BL and even-numbered bit line B are coupled in common to a column decoder 320.

The address may be used to access one or more memory cells MC in the core area. The address can be provided through the input/output end to the row decoder 310 and the column decoder 320 to select a corresponding target memory cell. In the context of this patent document, the word "target memory cell" can be used to indicate one of the memory cells MC targeted to be accessed from the memory controller or the user, and in some implementations the memory cells MC may be located at intersections between the word lines WL1-WL9 coupled to the row decoder 310 and the bit lines BL coupled to the column decoder 320.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one string STR, multiple transistors TR1-TR9 may be coupled to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode coupled to the first selection line DSL, but includes no floating gate FG. The second selection transistor S-TR, which is controlled to turn on/off by the second selection line SSL, has a gate electrode coupled to the second selection line SSL, but includes no floating gate FG.

The first selection transistor D-TR is used as a switch circuit that connects the corresponding string STR to the data register 330. The second selection transistor S-TR is used as a switch circuit that connects the corresponding string STR to the source line SL. That is, the first selection transistor D-TR and the second selection transistor S-TR can be used to enable or disable the corresponding string STR.

During a program operation, the memory system 100 fills the target memory cell MC of the bit line BL which is to be programmed with electrons. Accordingly, the memory system 100 applies a predetermined turn-on voltage Vcc to the gate electrode of the first selection transistor D-TR, thereby turning on the first selection transistor D-TR, and applies a predetermined turn-off voltage (for example, 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding string STR and drain to the source line SL, which corresponds to the ground voltage, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erase operation. The memory system 100 applies a certain voltage to allow both the first selection transistor D-TR and the second selection transistor S-TR to float during an erase operation. As a result, the applied erase voltage can remove electrical charges from the floating gate FG of the selected memory cell.

When the memory controller performs firmware operations, an inexecutable command can be generated due to an error in the firmware, and there is a probability for the memory controller to receive such an inexecutable command. In some cases, the memory device does not respond to inform the memory controller that an inexecutable command has been generated, and thus the memory controller is unable to identify the causes of the malfunction when a memory system malfunctions due to an inexecutable command. The technology disclosed in this patent document can be implemented in various embodiments to identify that an inexecutable command has been issued for the memory device.

Figure 4:
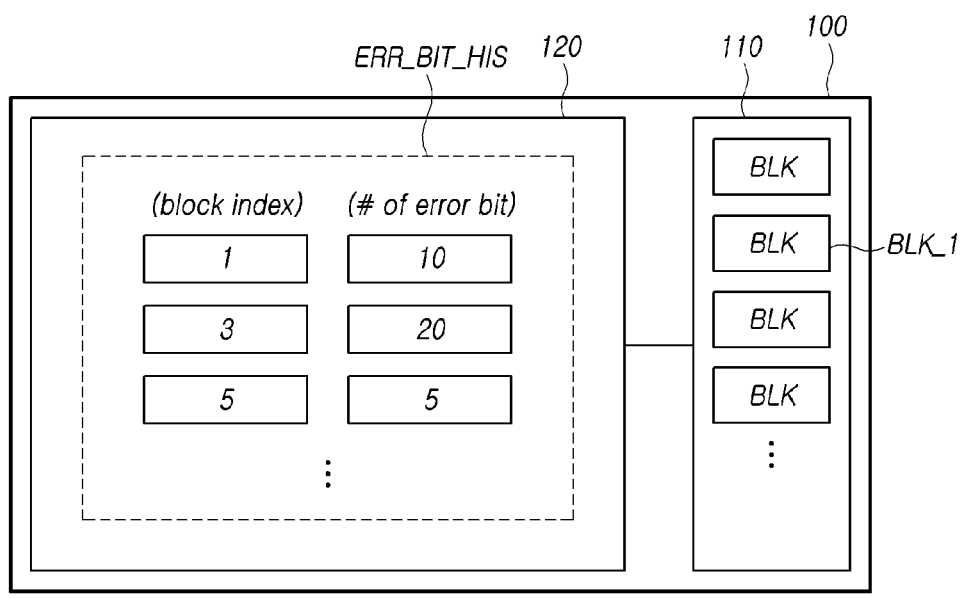
FIG. 4 is a schematic configuration diagram of the memory system according to exemplary embodiments of the present disclosure.

FIG. 4 is a schematic configuration diagram of the memory system 100 according to an exemplary embodiment of the present disclosure.

Referring to FIG. 4, the memory controller 120 of the memory system 100 may include an error bit history set ERR_BIT_HIS for storing the number of error bits generated during the read operation for the target memory block among a plurality of memory blocks BLK included in the memory device 110.

For example, the error bit history set ERR_BIT_HIS may be located on the working memory 125 inside the memory controller 120 or in a separate memory (e.g. TCM, SRAM, register).

The memory controller 120 may store information on the number of error bits generated in the first read operation in the error bit history set ERR_BIT_HIS according to the number of error bits generated during the first read operation for the first memory block BLK_1, which is one of the plurality of memory blocks BLK included in the memory device 110. Hereinafter, this will be described in detail with reference to FIG. 5.

Figure 5:
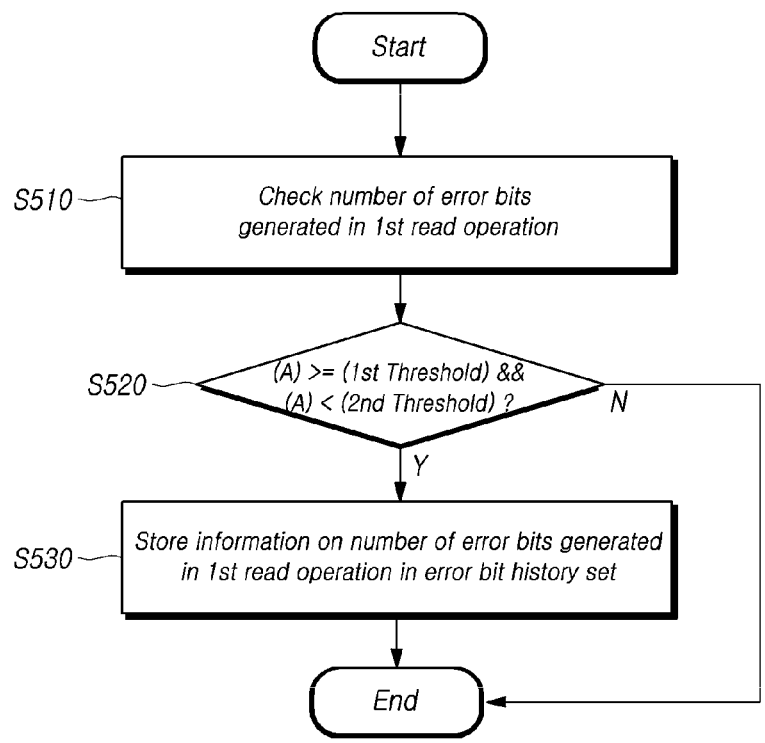
FIG. 5 is a flowchart illustrating an example of an operation of storing information on the number of error bits in the error bit history set by the memory system according to exemplary embodiments of the present disclosure.

FIG. 5 is a flowchart illustrating an example of an operation of storing information on the number of error bits in the error bit history set ERR_BIT_HIS by the memory system 100 according to an exemplary embodiment of the present disclosure.

Referring to FIG. 5, the memory controller 120 of the memory system 100 may check, or determine, the number A of error bits generated in the first read operation for the first memory block BLK_1 (S510).

The memory controller 120 may determine whether the value of A checked in step S510 is greater than or equal to a first threshold and less than a second threshold (S520). In this case, the second threshold is greater than the first threshold.

If the value of A is greater than or equal to the first threshold and less than the second threshold (S520-Y), the memory controller 120 may store information on the number A of error bits generated in the first read operation in the error bit history set ERR_BIT_HIS (S530). Meanwhile, if the value of A is less than the first threshold or greater than the second threshold (S520-N), the memory controller 120 may not perform a separate processing operation for the number A of error bits generated in the first read operation.

Hereinafter, the criterion for determining the above-described first and second threshold values will be described through a relationship between the read bias used during the read operation and the number of error bits generated during the read operation.

Figure 6:
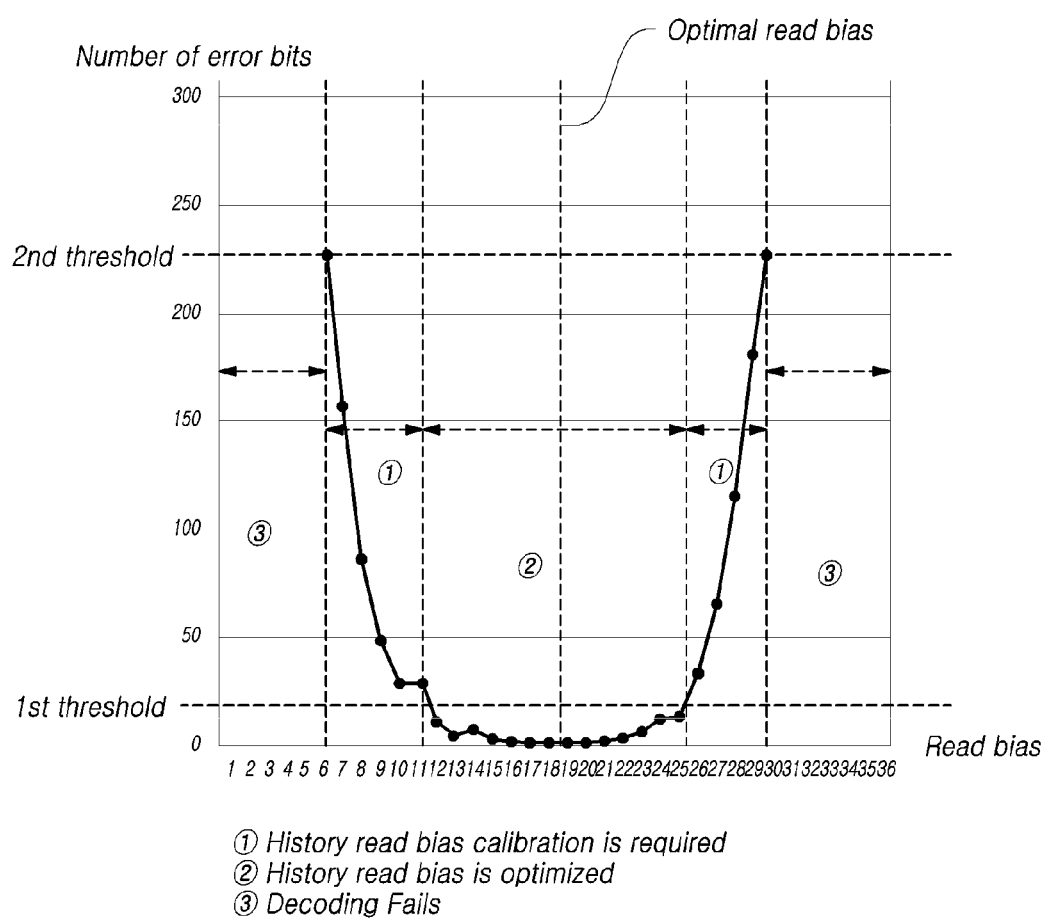
FIG. 6 is an example of a graph illustrating a relationship between the read bias used during the read operation and the number of error bits generated during the read operation.

FIG. 6 is an example of a graph illustrating a relationship between the read bias used during the read operation and the number of error bits generated during the read operation.

When the memory controller 120 performs an operation of reading data stored in a specific memory block included in the memory device 110, if the history read bias corresponding to the memory block is not updated, the memory controller 120 may perform the read operation using a predetermined default read bias. On the other hand, when the history read bias corresponding to the memory block is updated, the memory controller 120 may perform the read operation using the corresponding history read bias. In this case, the error bit generated during the read operation may vary depending on how different the read bias used during the read operation is from an optimal read bias corresponding to the minimum number of error bits as shown in FIG. 6.

Referring to FIG. 6, if the read bias used in the read operation is close to the optimal read bias, the number of error bits generated during the read operation is small. On the other hand, in the case that the difference between the read bias used in the read operation and the optimal read bias is large, the number of error bits generated during the read operation is large.

The read bias used in the read operation may have a larger difference than the optimal read bias in the following cases.

1. A case in which the state of a word line at a specific location in a memory block is different from that of other word lines in the corresponding memory block.

2. A case in which the value of the history read bias for the memory block is within the compensation range of the specific decoding algorithm but is not the optimal value.

3. A case in which the value of the history read bias for the memory block does not exist in the history read bias table.

4. A case in which the memory block is deteriorated due to retention, repeated read/write/erase operations, external shocks, etc., so the difference between the optimal read bias value in the current state and the history read bias value stored in the history read bias table is different.

In particular, in the case that a history read bias is used during the read operation, there may be a possibility that the history read bias is not optimized because the resolution size at which the history read bias is updated may be large due to a cost problem in the process of updating the history read bias. In addition, if the read operation for the memory block is not performed for a long time, the threshold voltage distribution of the corresponding memory block is deteriorated due to retention, and since the history read bias is an updated value before such retention occurs, there may be a possibility that optimization may not be performed.

If the number of error bits generated during the read operation exceeds a specific value, the operation of decoding the read data using a specific decoding algorithm, e.g., low density parity check (LDPC), may fail. In this case, the memory controller 120 may perform the operation of calibrating the error bit by executing a defense algorithm set to solve the decoding failure, and may perform the operation of calibrating the history read bias in an unoptimized state. In this case, the overhead required for the read operation may increase, and the time required for the read operation may increase, so that there may be a problem that does not satisfy the QoS for the host.

In this case, a value that serves as the criterion for determining whether the above-described decoding fails or not may be the second threshold value described in FIG. 4. That is, when the number of error bits generated during a read operation for the above-described first memory block BLK_1 is equal to or greater than the second threshold value, the memory controller 120 may determine that decoding of the read data has failed during the read operation of the first memory block BLK_1. In FIG. 6, the areas corresponding to ③ correspond to a case in which decoding has failed.

Meanwhile, in the embodiments of the present disclosure, the memory controller 120 may determine, although decoding failure has not occurred yet (since the difference between the history read bias used during the read operation and the optimal read bias is more than a certain level), whether there is a possibility of decoding failure due to deterioration of the memory block in which data is stored caused by retention issues, or read disturb in the future.

In this case, a value that serves as a reference for determining whether the memory block in which data is stored is in a state in which there is a possibility of deterioration may be the first threshold value described with reference to FIG. 4. That is, if the number of error bits generated during the read operation for the first memory block BLK_1 is greater than or equal to the first threshold and less than the second threshold, although a decoding failure has not occurred yet, it may be determined that there is a possibility that the decoding failure may occur due to deterioration of the first memory block BLK_1 in the future.

In the graph of FIG. 6, the areas corresponding to ① correspond to a case in which decoding failure may occur in the future.

Meanwhile, if the difference between the history read bias used in the read operation and the optimal read bias is less than a certain level, the memory controller 120 may determine that the history read bias is already optimized and thus does not need to be separately calibrated. In the graph of FIG. 6, the area corresponding to ② corresponds to the case in which the history read bias has already been optimized.

Therefore, in the case that it is determined that the area corresponding to ① of FIG. 6 has been entered, the memory controller 120 may preemptively calibrate the history read bias to reduce the number of error bits generated during the read operation, thereby preventing a case in which a decoding failure occurs during a read operation in advance.

Hereinafter, the operation of calibrating the history read bias when the memory system 100 enters the region corresponding to ① in FIG. 6 will be described in detail.

Figure 7:
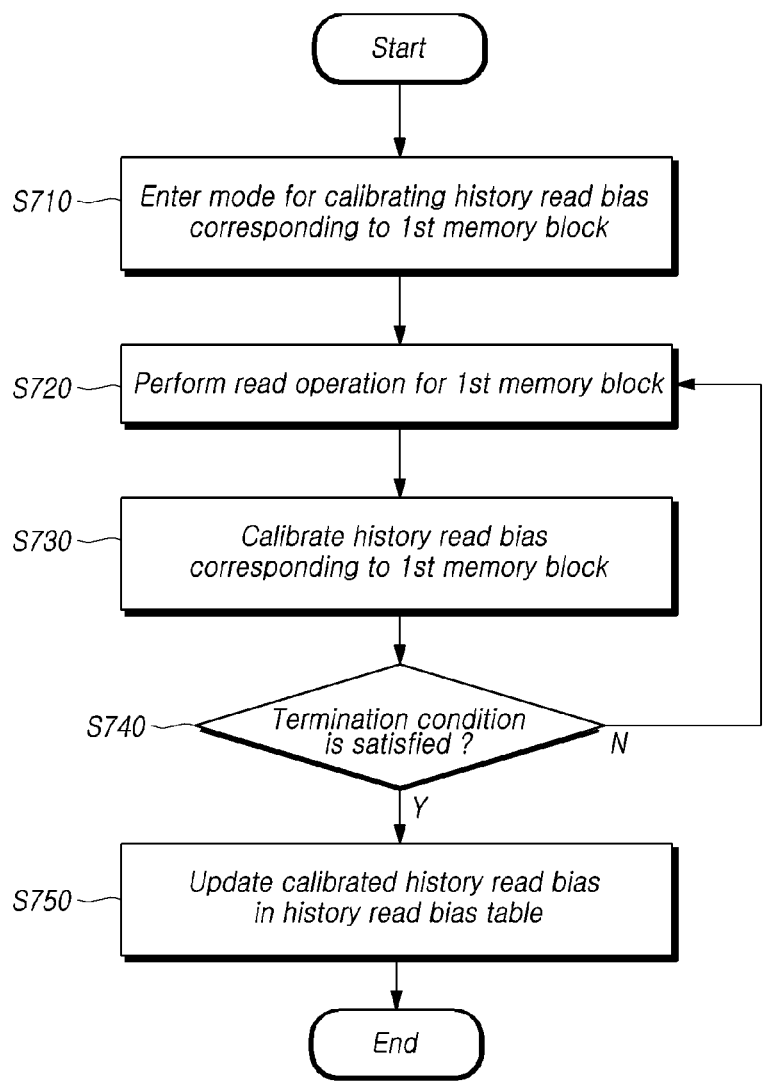
FIG. 7 is a flowchart illustrating an example of the operation of calibrating the history read bias by the memory system according to exemplary embodiments of the present disclosure.

FIG. 7 is a flowchart illustrating an example of the operation of calibrating the history read bias during the read operation of the first memory block BLK_1 according to an exemplary embodiment of the present disclosure.

Referring to FIG. 7, the memory controller 120 of the memory system 100 may enter a mode for calibrating the history read bias for the first memory block BLK_1 included in the memory device 110 (S710). In this case, when the number of error bits generated in the first read operation for the first memory block BLK_1 is greater than or equal to the first threshold value and less than the second threshold value, the memory controller 120 may store information on the number of error bits generated in the first read operation in the error bit history set ERR_BIT_HIS, and may enter the mode for calibrating the history read bias for the first memory block BLK_1.

The memory controller 120 of the memory system 100 may perform the read operation for the first memory block BLK_1 included in the memory device 110 (S720).

The step S720 may be a step which is executed after the memory system 100 enters the area corresponding to ① in FIG. 6. The read operation performed in step S720 may be the N-th read operation (N is a natural number) performed on the first memory block BLK_1 after the first read operation.

In addition, the memory controller 120 may calibrate the history read bias corresponding to the first memory block BLK_1 according to the result of the read operation on the first memory block BLK_1 executed in step S720 (S730). A specific example in which the memory controller 120 calibrates the history read bias in step S730 will be described in detail with reference to FIG. 12 below.

The memory controller 120 may determine whether the specific termination condition is satisfied after step S730 (S740). A specific example of the termination condition will be described in detail in FIG. 13 below.

In the case that the specific termination condition is satisfied (S740—Y), the memory controller 120 may update the calibrated history read bias to the history read bias table (S750). When the read operation for the first memory block BLK_1 is performed after step S750, the updated history read bias value in the history read bias table in step S750 may be used.

Meanwhile, if the termination condition is not satisfied (S730—N), the memory controller 120 may enter the step S720 again, and may repeat an operation of performing the read operation on the first memory block BLK_1 and calibrating the history read bias corresponding to the first memory block BLK_1.

In the above, the overall operation of the memory system 100 according to exemplary embodiments of the present disclosure has been described.

Hereinafter, an example of the error bit history set ERR_BIT_HIS described in FIG. 4 will be described.

Figure 8:
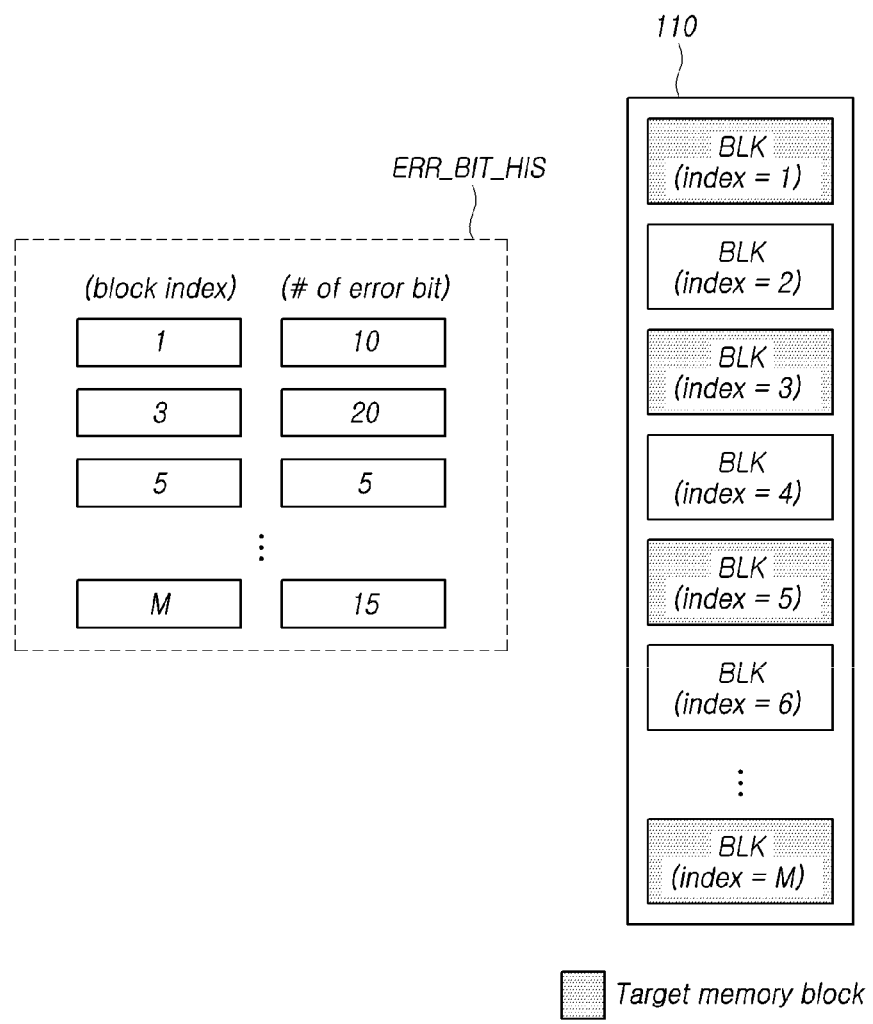
FIG. 8 is a diagram illustrating an example of information stored in an error bit history set according to exemplary embodiments of the present disclosure.

FIG. 8 is a diagram illustrating an example of information stored in an error bit history set ERR_BIT_HIS according to an exemplary embodiment of the present disclosure.

The error bit history set ERR_BIT_HIS may store information on the number of error bits generated in the read operation for the target memory block which is a memory block for calibrating the history read bias among the plurality of memory blocks BLK included in the memory device 110 (that is, a memory block in which the operation for calibrating the corresponding history read bias is being executed).

Referring to FIG. 8, it is assumed that the memory blocks with index of 1, 3, 5, ..., M among the plurality of memory blocks BLK included in the memory device 110 are target memory blocks which are targets for calibrating the history read bias. However, the index value of the target memory block described in FIG. 8 is exemplary, and the index value of the target memory block is not limited to a specific value in the embodiments of the present disclosure.

In this example, the error bit history set ERR_BIT_HIS may store the number of error bits generated during the read operation for the target memory block. In FIG. 8, the error bit history set ERR_BIT_HIS may store, for example, the number 10 of error bits generated during a read operation for the target memory block of index 1, the number 20 of error bits generated during the read operation for the target memory block of index 3, the number 5 of error bits generated during the read operation for the target memory block of index 5, and the number 15 of error bits generated during the read operation for the target memory block of index M.

Meanwhile, the error bit history set ERR_BIT_HIS may be composed of various types of data structures (e.g. tables, hashes, trees, lists). Hereinafter, in FIG. 9, a case of configuring the error bit history set ERR_BIT_HIS as a linked list will be described.

Figure 9:
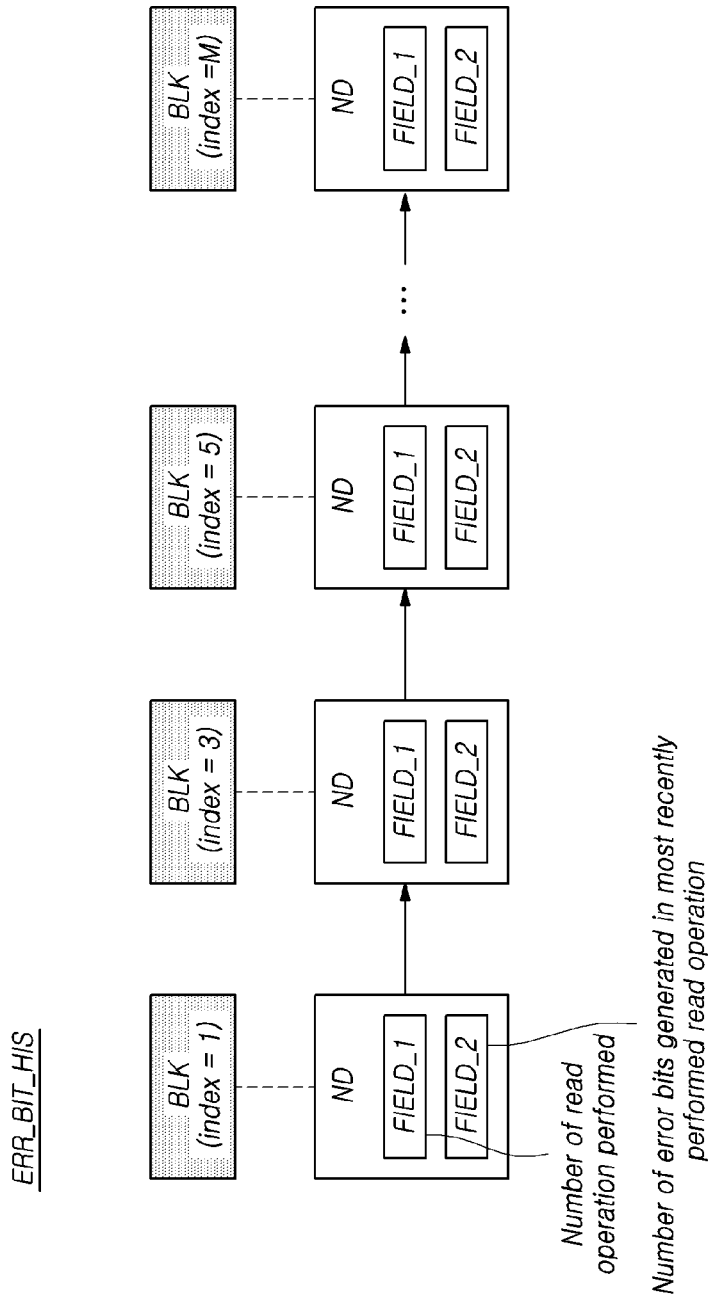
FIG. 9 is a diagram illustrating an example of the data structure of the error bit history set according to exemplary embodiments of the present disclosure.

FIG. 9 is a diagram illustrating an example of the data structure of the error bit history set ERR_BIT_HIS according to an exemplary embodiment of the present disclosure.

Referring to FIG. 9, the error bit history set ERR_BIT_HIS may be a linked list including one or more nodes ND.

In this case, the nodes ND included in the error bit history set ERR_BIT_HIS may correspond to any one of the target memory blocks described in FIG. 8, respectively. For example, the error bit history set ERR_BIT_HIS may include a node corresponding to the target memory block of index 1, a node corresponding to the target memory block of index 3, and a node corresponding to the target memory block of index 5, and a node corresponding to the target memory block of index M.

In addition, each node ND included in the error bit history set ERR_BIT_HIS may include the first field FIELD_1 and the second field FIELD_2.

The first field FIELD_1 of the node is a field for storing the number of read operations performed on the target memory block corresponding to the node from the time the node is generated. For example, if the read operation for the target memory block of index 1 is executed 3 times after the node for the target memory block of index 1 is generated, the value of the first field FIELD_1 of the corresponding node may be 3.

The second field FIELD_2 of the node is a field for storing the number of error bits generated in the most recently executed read operation for the target memory block corresponding to the node. For example, if three read operations are sequentially executed for the target memory block of index 1 and the number of error bits generated during each read operation is 5, 8, and 11, the value of the second field FIELD_2 of the corresponding node may be 11.

Figure 10:
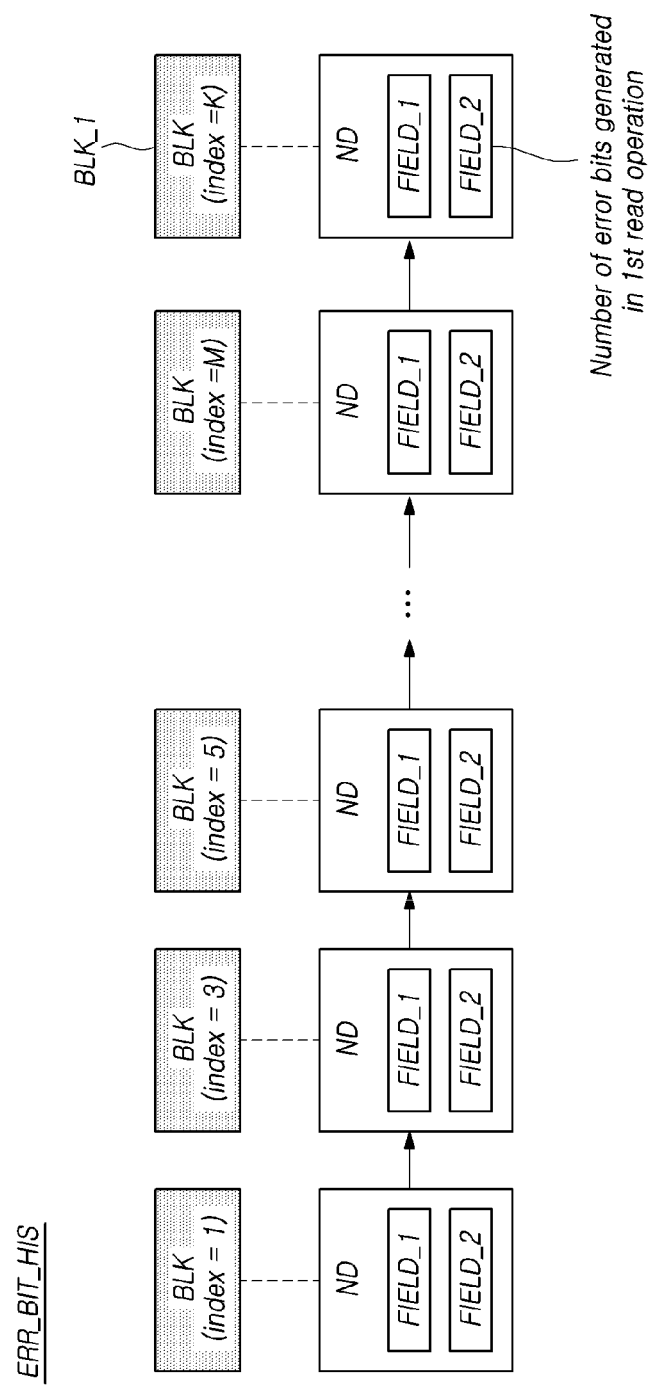
FIG. 10 is a diagram illustrating an example of the operation in which the node for the first memory block is added to the error bit history set described in FIG. 9.

As shown in FIG. 9, in the case that the structure of the error bit history set ERR_BIT_HIS is a linked list, the operation of storing the information on the number of error bits generated in the first read operation for the first memory block BLK_1 in the error bit history set may be performed as shown in FIG. 10.

FIG. 10 is a diagram illustrating an example of the operation in which the node for the first memory block BLK_1 is added to the error bit history set ERR_BIT_HIS described in FIG. 9.

Referring to FIG. 10, the index of the first memory block BLK_1 is K, and the node corresponding to the memory block BLK of the index K does not exist in the error bit history set ERR_STR_HIS. In this case, the memory controller 120 may newly create a node corresponding to the first memory block BLK_1 and may add the node to the error bit history set ERR_STR_HIS.

In this case, the location where the node corresponding to the first memory block BLK_1 is added in the error bit history set ERR_STR_HIS is not limited to a specific location. In FIG. 10, the case where the node corresponding to the first memory block BLK_1 is added after a tail node (a node corresponding to the memory block of index M) of the error bit history set ERR_STR_HIS is described as an example. However, the node corresponding to the first memory block BLK_1 may be added in front of the head node of the error bit history set ERR_STR_HIS or after any node of the error bit history set ERR_STR_HIS.

Figure 11:
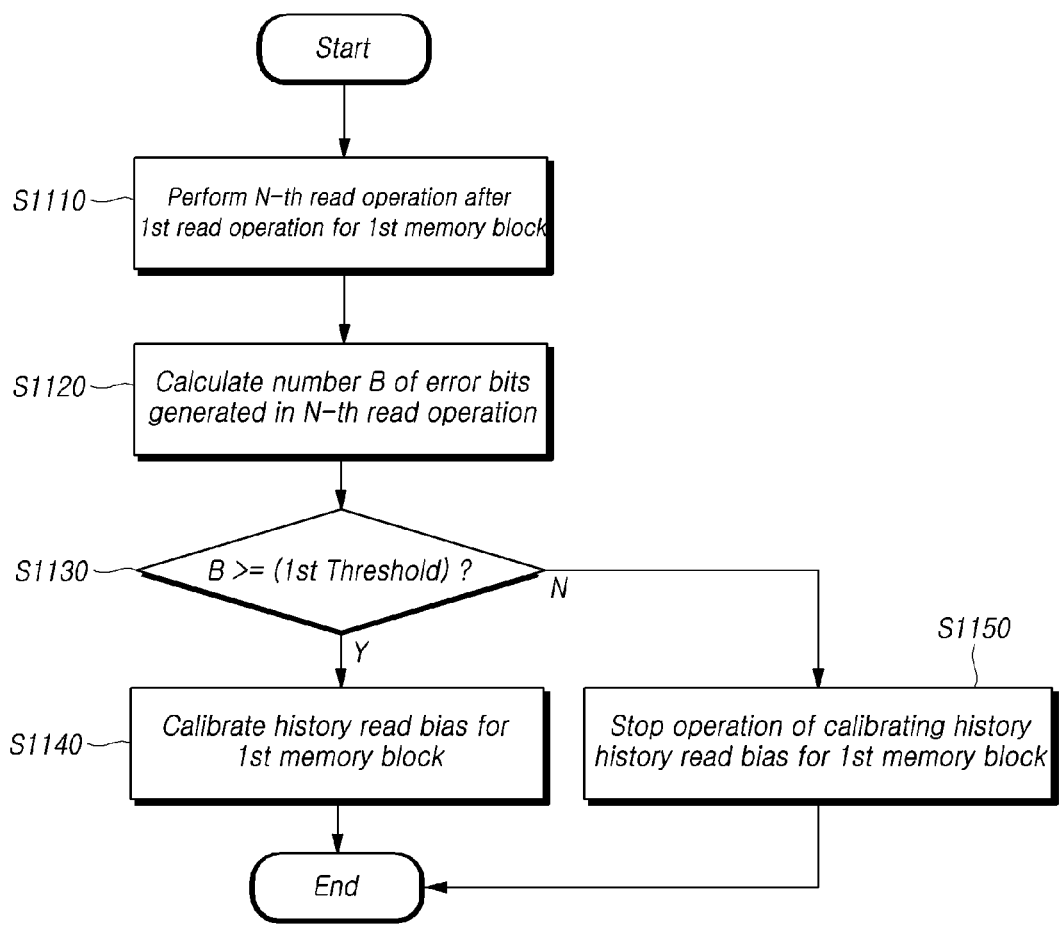
FIG. 11 is a flowchart illustrating an example of the operation of calibrating the history read bias by the memory system according to exemplary embodiments of the present disclosure.

FIG. 11 is a flowchart illustrating an example of the operation of calibrating the history read bias by the memory system 100 according to an exemplary embodiment of the present disclosure.

In FIG. 11, it is assumed that the number of error bits generated in the first read operation for the first memory block BLK_1 is greater than or equal to the first threshold value and less than the second threshold value, and thereby the memory controller 120 stores information on the number of error bits generated in the first read operation in the error bit history set ERR_STR_HIS.

Thereafter, the memory controller 120 may perform an N-th (N is a natural number) read operation on the first memory block BLK_1 after the first read operation (S1110).

In addition, the memory controller 120 may calculate the number B of error bits generated in the N-th read operation performed in step S1110 (S1120).

The memory controller 120 may determine whether the B value calculated in step S1120 is equal to or greater than the above-described first threshold (S1130). If the B value is equal to or greater than the first threshold (S1130—Y), the memory controller 120 may perform the operation of calibrating the history read bias for the first memory block BLK_1 (S1140).

Meanwhile, if the B value is less than the first threshold (S1130-N), the memory controller 120 may stop the operation of calibrating the history read bias for the first memory block BLK_1 (S1150). When the B value is less than the first threshold, it means that the history read bias is already optimized, that is, in the state 2 in FIG. 6, and it is not required to further calibrate the history read bias.

Hereinafter, when the memory controller 120 calibrates the history read bias for the first memory block BLK_1, a change state of the calibration value of the history read bias according to the read operation will be described.

Figure 12:
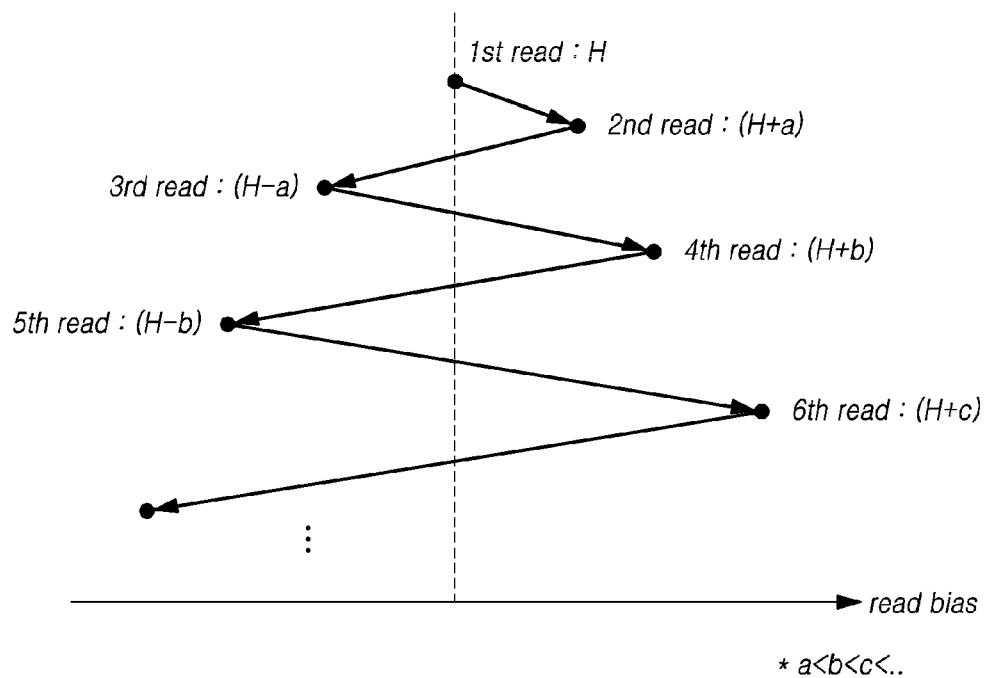
FIG. 12 is a graph showing an example of a change in the calibration value of the history read bias according to the read operation.

FIG. 12 is a graph showing an example of a change in the calibration value of the history read bias according to the read operation.

When the memory controller 120 calibrates the history read bias for the first memory block BLK_1, the direction in which the history read bias is calibrated may be opposite to the direction in which the history read bias was previously calibrated. Here, the calibration direction in which the history read bias is calibrated may mean whether the value of the history read bias increases or decreases.

In FIG. 12, the calibrated history read bias value in the first read operation is H, and the calibrated history read bias value in the second read operation is H+a. That is, in the second read operation, the history read bias is calibrated in the direction in which the value increases.

In the subsequent third read operation, the calibrated history read bias value is H−a. That is, in the third read operation, the history read bias is calibrated in a direction in which the value decreases, unlike in the case of the second read operation.

With this pattern, the calibrated history read bias value in the fourth read operation is H+b, and is calibrated in the direction in which the value increases, unlike the case at the third read operation. In addition, the calibrated history read bias value in the fifth read operation is H-b and is calibrated in the direction in which the value decreases, unlike the case at the fourth read operation.

In addition, the calibrated history read bias value in the sixth read operation is H+c, and is calibrated in the direction of increasing the value, unlike the case at the fifth read operation.

In general, the calibration direction for the history read bias in the N-th read operation after the first read operation for the first memory block BLK_1 is opposite to the calibration direction of the history read bias in the previous read operation, that is, the (N−1)-th read operation.

In addition, when the memory controller 120 calibrates the history read bias for the first memory block BLK_1, the size of the calibration offset of the history read bias may be greater than or equal to the size of the calibration offset of the history read bias during the previous read operation.

Referring to FIG. 12, during the second read operation, the size of the calibration offset of the history read bias is a, which is the difference between H and (H+a), and the size of the calibration offset of the history read bias during the third read operation is a, which is the difference between H and (H−a) and is the same as in the case of the second read operation.

In addition, the size of the calibration offset of the history read bias during the fourth read operation is b, which is the difference between (H+b) and H, and the value of b is greater than a. In the fifth read operation, the size of the calibration offset of the history read bias is b, which is the difference between (H−b) and H, and is the same as that in the fourth read operation.

In the sixth read operation, the size of the calibration offset of the history read bias is c, which is the difference between (H+c) and H, and the value of c is greater than b.

If generalizing, the size of the calibration offset by which the history read bias is calibrated in the Nth read operation after the first read operation for the first memory block BLK_1 may be greater than or equal to the size of the calibration offset by which the history read bias is calibrated in the previous read operation, that is, the (N−1)th read operation.

In the embodiments of the present disclosure, the reason for calibrating the history read bias in a zigzag manner as in the pattern described in FIG. 12 is to increase the degree of change in the history read bias compared to the initial history read bias. This is to quickly enter the state in which the history read bias is optimized as shown in ① of FIG. 6, or the state in which decoding failure occurs as in ③ of FIG. 6.

Meanwhile, as described above with reference to FIG. 7, in embodiments of the present disclosure, the memory controller 120 of the memory system 100 may calibrate the history read bias operation until a specific termination condition is satisfied. Hereinafter, it will be described the case in which the memory system 100 terminates the operation of calibrating the history read bias when the termination condition is satisfied.

Figure 13:
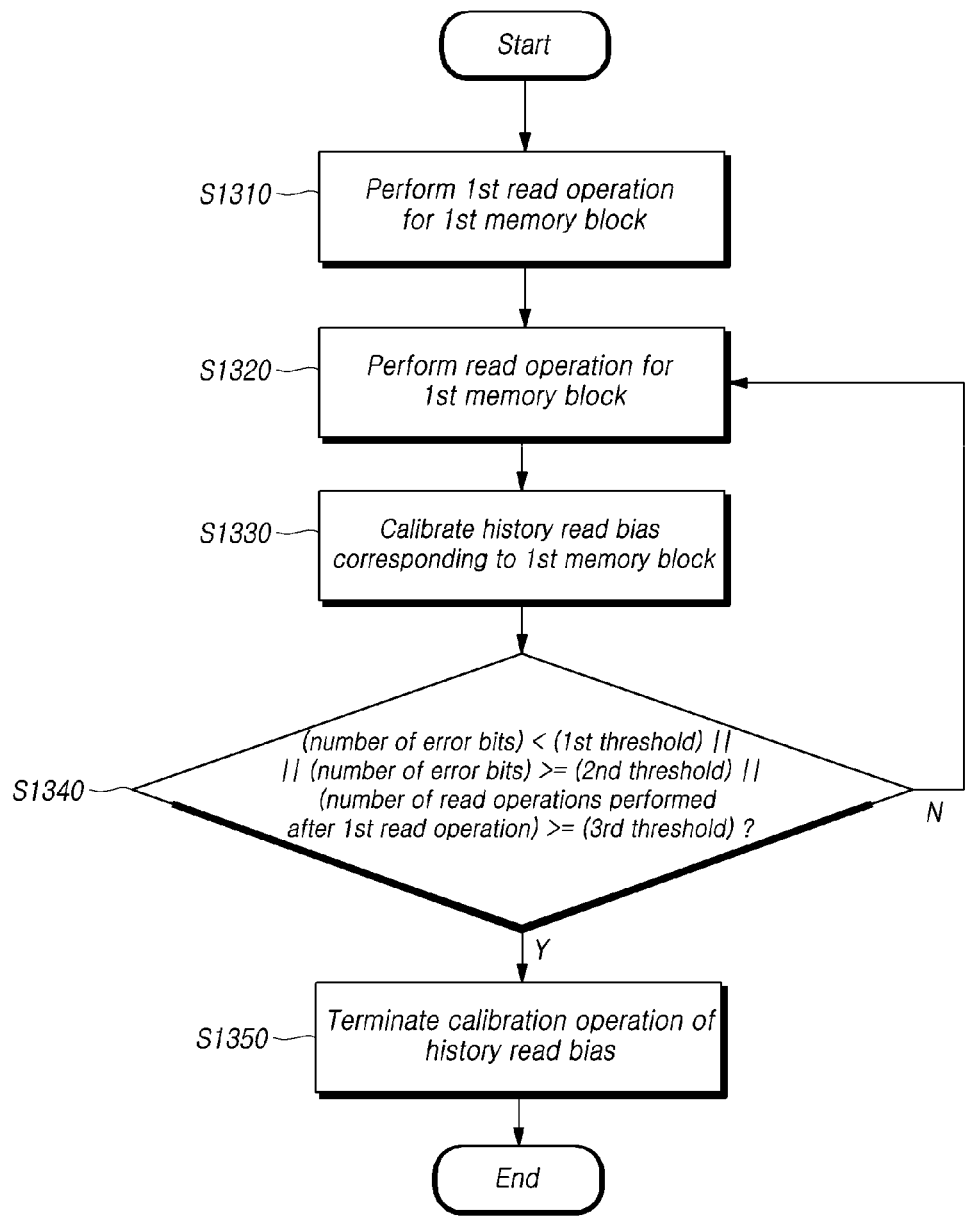
FIG. 13 is a flowchart illustrating an example of terminating an operation of calibrating the history read bias by the memory system according to exemplary embodiments of the present disclosure.

FIG. 13 is a flowchart illustrating an example of terminating an operation of calibrating the history read bias by the memory system 100 according to an exemplary embodiment of the present disclosure.

Referring to FIG. 13, the memory controller 120 of the memory system 100 may first perform the first read operation for the first memory block BLK_1 (S1310). In this case, the number of error bits generated in the first read operation for the first memory block BLK_1 may be greater than or equal to the first threshold and less than the second threshold.

In addition, the memory controller 120 may perform the additional read operation on the first memory block BLK_1 (S1320). In this case, the additional read operation may be the Nth (N is a natural number) read operation after the first read operation on the first memory block BLK_1.

In addition, the memory controller 120 may calibrate the history read bias corresponding to the first memory block BLK_1 based on the number of error bits generated during the read operation performed in step S1320 (S1330).

Thereafter, the memory controller 120 may determine whether the number of error bits generated during the read operation performed in step S1320 is less than the first threshold value or greater than the second threshold value, or whether the number of read operations performed after the first read operation is equal to or greater than the third threshold (S1340). That is, the termination condition may be the condition in which the number of error bits generated in the read operation for the first memory block BLK_1 is less than the first threshold value or more than the second threshold value, or the condition in which the number of read operations performed after the first read operation is equal to or greater than the third threshold.

If the number of error bits generated during the read operation is less than the first threshold value, or more than the second threshold value, or the number of read operations executed after the first read operation is greater than or equal to the third threshold value (S1340—Y), the memory controller 120 may terminate the operation of calibrating the history read bias (S1350).

When the termination condition is satisfied and the memory controller 120 terminates the operation of calibrating the history read bias, the memory controller 120 may remove information on the number of error bits corresponding to the first memory block BLK_1 from the error bit history set ERR_BIT_HIS. This is because the first memory block BLK_1 is no longer the target memory block for which the history read bias is calibrated.

For example, in the case that the error bit history set ERR_BIT_HIS is the linked list described in FIG. 9, the memory controller 120 may delete the node corresponding to the first memory block BLK_1 from the error bit history set ERR_BIT_HIS.

On the other hand, if the number of error bits generated during the read operation is greater than or equal to the first threshold and less than the second threshold, and the number of read operations executed after the first read operation is less than the third threshold (S1340—N), the memory controller 120 may perform the step S1320 again.

Figure 14:
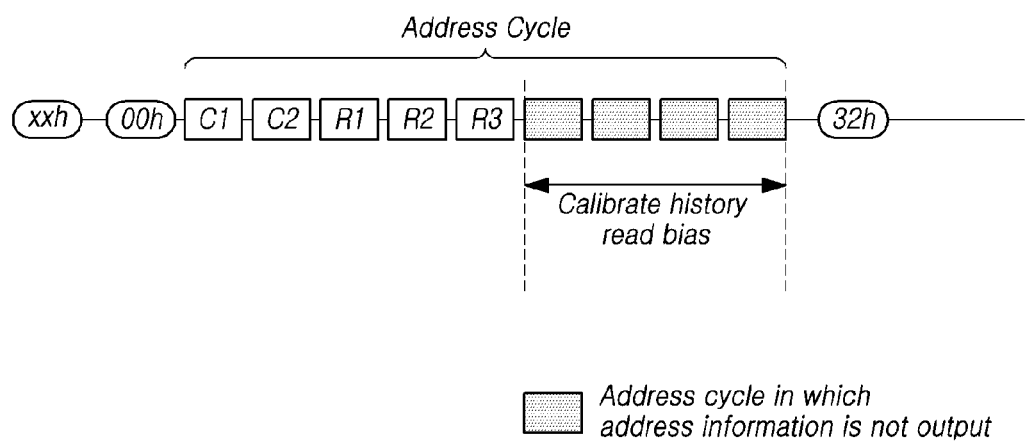
FIG. 14 is a diagram illustrating an example of the time point at which the memory system according to exemplary embodiments of the present disclosure.

FIG. 14 is a diagram illustrating an example of the timing at which the memory system 100 calibrates the history read bias according to an exemplary embodiment of the present disclosure.

The memory controller 120 of the memory system 100 may calibrate the history read bias during the read operation instead of separately calibrating the history read bias at a time before or after the read operation.

As an example, the memory controller 120 may calibrate the history read bias during the address cycle (e.g. 6th cycle to 9th cycle) in which address information is not output during the read operation.

Referring to FIG. 14, among the nine address cycles used in the read operation, address information is output in the first five address cycles, but the address information is not output in the subsequent four address cycles. In this case, the memory controller 120 of the memory system 100 may calibrate the history read bias in four address cycles in which address information is not output, thereby omitting the separate operation performed to calibrate the history read bias before and after the read operation.

Figure 15:
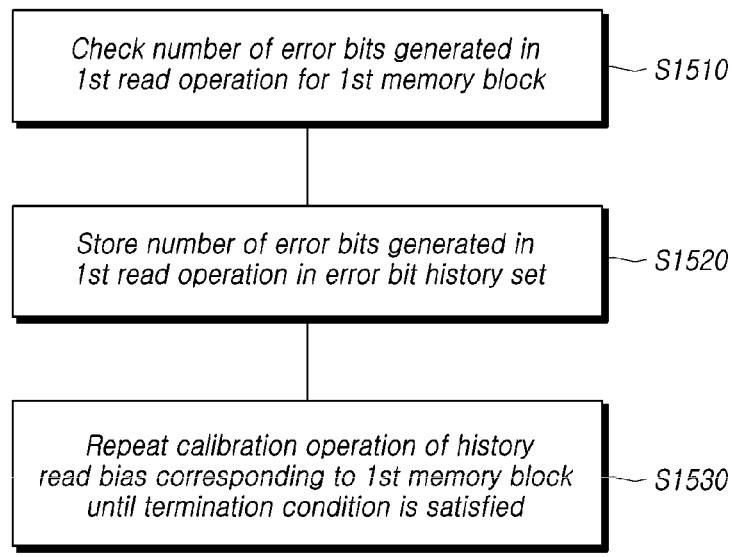
FIG. 15 is a diagram illustrating the method of operating the memory system according to exemplary embodiments of the present disclosure.

FIG. 15 is a diagram illustrating a method of operating the memory system 100 according to an exemplary embodiment of the present disclosure.

Referring to FIG. 15, the operating method of the memory system 100 may include the step for checking, or determining, the number of error bits generated in the first read operation for the first memory block BLK_1 among the plurality of memory blocks BLK included in the memory device 110 (S1510).

In addition, the operating method of the memory system 100 may include, when the number of error bits generated in the first read operation is greater than or equal to the first threshold and less than the second threshold, the step for storing information on the number of error bits generated in the first read operation in the error bit history set ERR_BIT_HIS (S1520).

The error bit history set ERR_BIT_HIS may store the number of error bits generated during the read operation for the target memory block, which is a memory block for which the history read bias is calibrated among the plurality of memory blocks BLK.

In addition, the operation method of the memory system 100 may include the step for repeating the operation of calibrating the history read bias corresponding to the first memory block BLK_1 during the read operation executed after the first read operation on the first memory block BLK_1 until the specific termination condition is satisfied (S1530).

The second threshold may be the value that serves as a reference for determining whether decoding has failed or not during the read operation for the first memory block BLK_1.

The error bit history set ERR_BIT_HIS may be the linked list including the node ND corresponding to any one of the target memory blocks. In this case, the node ND may include a first field FIELD_1 for storing the number of read operations performed on the target memory block corresponding to the node ND from the time when the node ND is created, and a second field FIELD_2 for storing the number of error bits generated in the most recently executed read operation for the target memory block corresponding to the node ND.

Meanwhile, when information on the number of error bits generated in the first read operation is stored in the error bit history set ERR_BIT_HIS, the node corresponding to the first memory block BLK_1 may be added to the error bit history set ERR_BIT_HIS, and the second field FIELD_2 of the node corresponding to the first memory block BLK_1 may be set to the number of error bits generated in the first read operation.

The history read bias corresponding to the first memory block BLK_1 may be calibrated when the number of error bits generated in the Nth (N is a natural number) read operation performed after the first read operation for the first memory block BLK_1 is greater than or equal to the first threshold.

In this case, the calibration direction of the history read bias may be opposite to the calibration direction of the history read bias in the (N−1)-th read operation performed on the first memory block BLK_1 after the first read operation. In addition, the size of the calibration offset of the history read bias may be greater than or equal to the size of the calibration offset of the history read bias in the (N−1)-th read operation performed after the first read operation for the first memory block BLK_1.

The termination condition described in step S1530 may be, for example, the condition in which the number of error bits generated in the read operation performed after the first read operation for the first memory block BLK_1 is less than the first threshold or greater than the second threshold, or the condition in which the number of read operations performed after the first read operation is equal to or greater than the third threshold. Meanwhile, when the termination condition is satisfied, information on the number of error bits corresponding to the first memory block BLK_1 may be removed from the error bit history set ERR_BIT_HIS.

Meanwhile, the value of the history read bias for the first memory block BLK_1 may be calibrated during an address cycle in which address information is not output during the read operation performed after the first read operation for the first memory block BLK_1.

In some implementations, the operation of the memory controller 120 described above may be controlled by the control circuit 123, and may be performed in such a manner that the processor 124 executes (drives) firmware in which the overall operation of the memory controller 120 is programmed.

Figure 16:
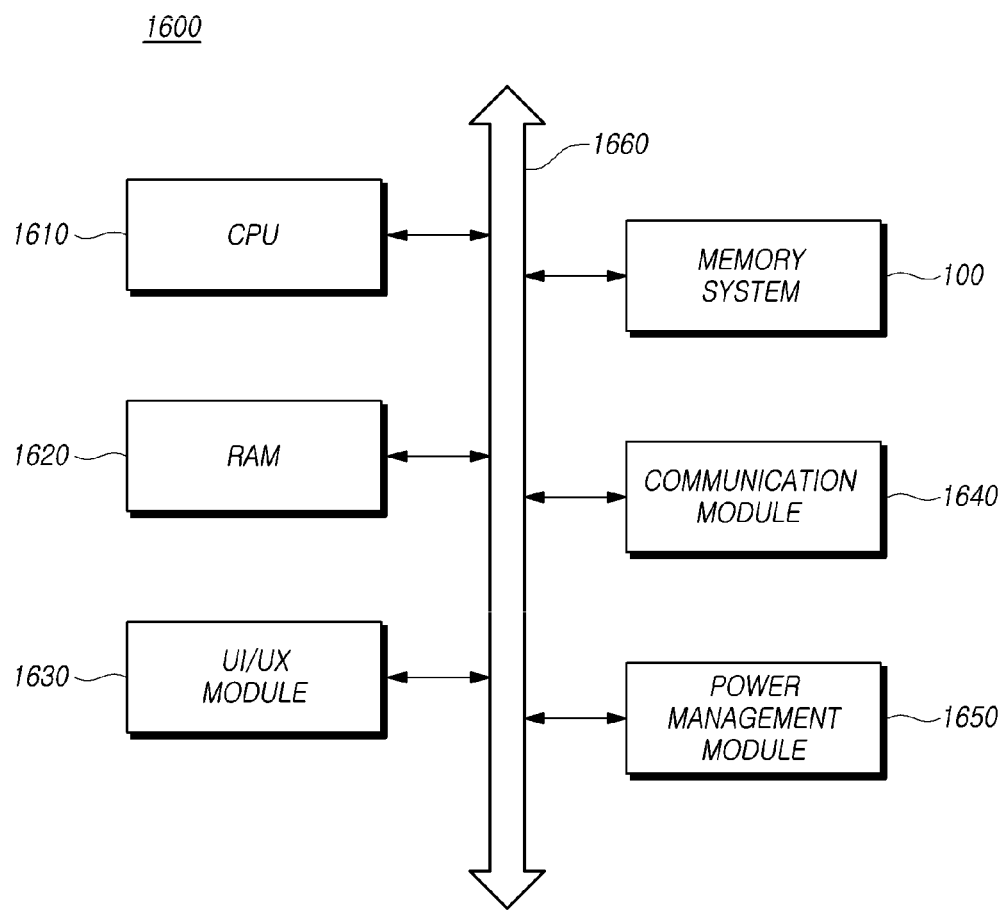
FIG. 16 is a diagram illustrating the configuration of a computing system based on embodiments of the disclosed technology.

FIG. 16 is a diagram illustrating the configuration of a computing system 1600 based on an embodiment of the disclosed technology.

Referring to FIG. 16, the computing system 1600 based on an embodiment of the disclosed technology may include: a memory system 100 electrically coupled to a system bus 1660; a CPU 1610 configured to control the overall operation of the computing system 1600; a RAM 1620 configured to store data and information related to operations of the computing system 1600; a user interface/user experience (UI/UX) module 1630 configured to provide the user with a user environment; a communication module 1640 configured to communicate with an external device as a wired and/or wireless type; and a power management module 1650 configured to manage power used by the computing system 1600.

The computing system 1600 may be a personal computer (PC) or may include a mobile terminal such as a smartphone, a tablet or various electronic devices.

The computing system 1600 may further include a battery for supplying an operating voltage, and may further include an application chipset, a graphic-related module, a camera image processor, and a DRAM. Other elements would be obvious to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

According to the exemplary embodiments of the disclosed technology described above, the operation delay time of the memory system may be reduced or minimized. In addition, the disclosed technology can be implemented in a way that reduces or minimizes an overhead occurring in the process of calling a specific function. Although various embodiments of the disclosed technology have been described for illustrative purposes, those skilled in the art will appreciate that various modifications, additions and substitutions are possible based on what is described and illustrated in this patent document.

What is claimed is:

1. A memory system, comprising:
a memory device including a plurality of memory blocks; and
a memory controller for communicating with the memory device and controlling the memory device,
wherein the memory controller is operable to:
determine whether to store information on a number of error bits generated in a first read operation in an error bit history set by determining whether the number of error bits generated in the first read operation for a first memory block among the plurality of memory blocks is greater than or equal to a first threshold and less than a second threshold, the first threshold and the second threshold being greater than zero;
in response to determining that the number of error bits generated in the first read operation for the first memory block is greater than or equal to the first threshold and less than the second threshold, store the number of error bits generated in the first read operation in the error bit history set; and
repeat, during a read operation performed after the first read operation for the first memory block, an operation of calibrating a history read bias corresponding to the first memory block until a termination condition is satisfied,
wherein the error bit history set stores the number of error bits generated during a read operation for a target memory block, which is a memory block for which the history read bias is calibrated among the plurality of memory blocks.

2. The memory system of claim 1, wherein the second threshold is a value that serves as a reference for determining whether decoding fails or not during the read operation performed on the first memory block.

3. The memory system of claim 1, wherein the error bit history set is a linked list including nodes, each node corresponding to a different target memory block,
wherein each node includes:
a first field storing a number of read operations performed for the target memory block corresponding to the node from a time when the node is generated; and
a second field storing the number of error bits generated in the most recently performed read operation for the target memory block corresponding to the node.

4. The memory system of claim 3, wherein the memory controller, when storing information on the number of error bits generated in the first read operation in the error bit history set, generates a node corresponding to the first memory block and inserts the node into the linked list, and sets the second field of the node corresponding to the first memory block as the number of error bits generated in the first read operation.

5. The memory system of claim 1, wherein memory controller calibrates the history read bias when the number of error bits generated in an N-th read operation performed after the first read operation on the first memory block is equal to or greater than the first threshold value.

6. The memory system of claim 5, wherein the calibration direction of the history read bias in the N-th read operation is opposite to the calibration direction of the history read bias in an (N−1)-th read operation performed after the first read operation for the first memory block.

7. The memory system of claim 1, wherein a size of calibration offset for the history read bias in an N-th read operation is equal to or greater than the size of calibration offset for the history read bias in an (N−1)-th read operation performed after the first read operation for the first memory block.

8. The memory system of claim 1, wherein the termination condition is a condition in which the number of error bits generated in the read operation performed after the first read operation for the first memory block is less than the first threshold value or greater than the second threshold value, or a condition in which a number of read operations performed after the first read operation is equal to or greater than a third threshold.

9. The memory system of claim 1, wherein the memory controller removes information on the number of error bits corresponding to the first memory block from the error bit history set when the termination condition to terminate calibration of the history read bias is satisfied.

10. The memory system of claim 1, wherein the memory controller calibrates the history read bias after the first read operation on the first memory block, and wherein the history read bias is calibrated during a portion of an address cycle in which address information is not output, the address cycle being part of a read operation performed after the first read operation on the first memory block.

11. An operating method of a memory system including a memory device including a plurality of memory blocks, comprising:
determining a number of error bits generated in a first read operation for a first memory block among the plurality of memory blocks;

storing information on the number of error bits generated in the first read operation in an error bit history set when the number of error bits generated in the first read operation satisfies a storage condition but not when the storage condition is not met, wherein the storage condition is the number of error bits being greater than or equal to a first threshold and less than a second threshold; and repeating, during a read operation performed after the first read operation for the first memory block, an operation of calibrating a history read bias corresponding to the first memory block until a set termination condition is satisfied, wherein the error bit history set stores the number of error bits generated during a read operation for a target memory block, which is a memory block for which the history read bias is calibrated among the plurality of memory blocks.

12. The operating method of claim 11, wherein the second threshold is a value that serves as a reference for determining whether decoding fails or not during the read operation performed on the first memory block.

13. The operating method of claim 11, wherein the error bit history set is a linked list including nodes, each node corresponding to a different target memory block, wherein each of the nodes includes:
a first field storing a number of read operations performed for the target memory block corresponding to the node from a time when the node is generated; and
a second field storing the number of error bits generated in the most recently performed read operation for the target memory block corresponding to the node.

14. The operating method of claim 13, wherein, when storing information on the number of error bits generated in the first read operation in the error bit history set, the node corresponding to the first memory block is added to the linked list, and the second field of the node corresponding to the first memory block is set as the number of error bits generated in the first read operation.

15. The operating method of claim 13, wherein the history read bias is calibrated when the number of error bits generated in an N-th read operation performed after the first read operation on the first memory block is equal to or greater than the first threshold value.

16. The operating method of claim 15, wherein the calibration direction of the history read bias in the N-th read operation is opposite to the calibration direction of the history read bias in an (N−1)-th read operation performed after the first read operation for the first memory block.

17. The operating method of claim 15, wherein a size of calibration offset for the history read bias in the N-th read operation is equal to or greater than the size of calibration offset for the history read bias in an (N−1)-th read operation performed after the first read operation for the first memory block.

18. The operating method of claim 11, wherein the termination condition is a condition in which the number of error bits generated in the read operation performed after the first read operation for the first memory block is less than the first threshold value or greater than the second threshold value, or a condition in which a number of read operations performed after the first read operation is equal to or greater than a third threshold.

19. The operating method of claim 11, wherein information on the number of error bits corresponding to the first memory block is removed from the error bit history set when the termination condition to terminate calibration of the history read bias is satisfied.

20. The operating method of claim 11, wherein the history read bias is calibrated during an address cycle in which address information is not output, the address cycle being part of a read operation performed after the first read operation on the first memory block.

* * * * *